March 22, 1966  C. R. STEELE  3,241,587
METHOD OF DISINTEGRATING VEGETAL MATTER
Original Filed Nov. 17, 1960  2 Sheets-Sheet 1
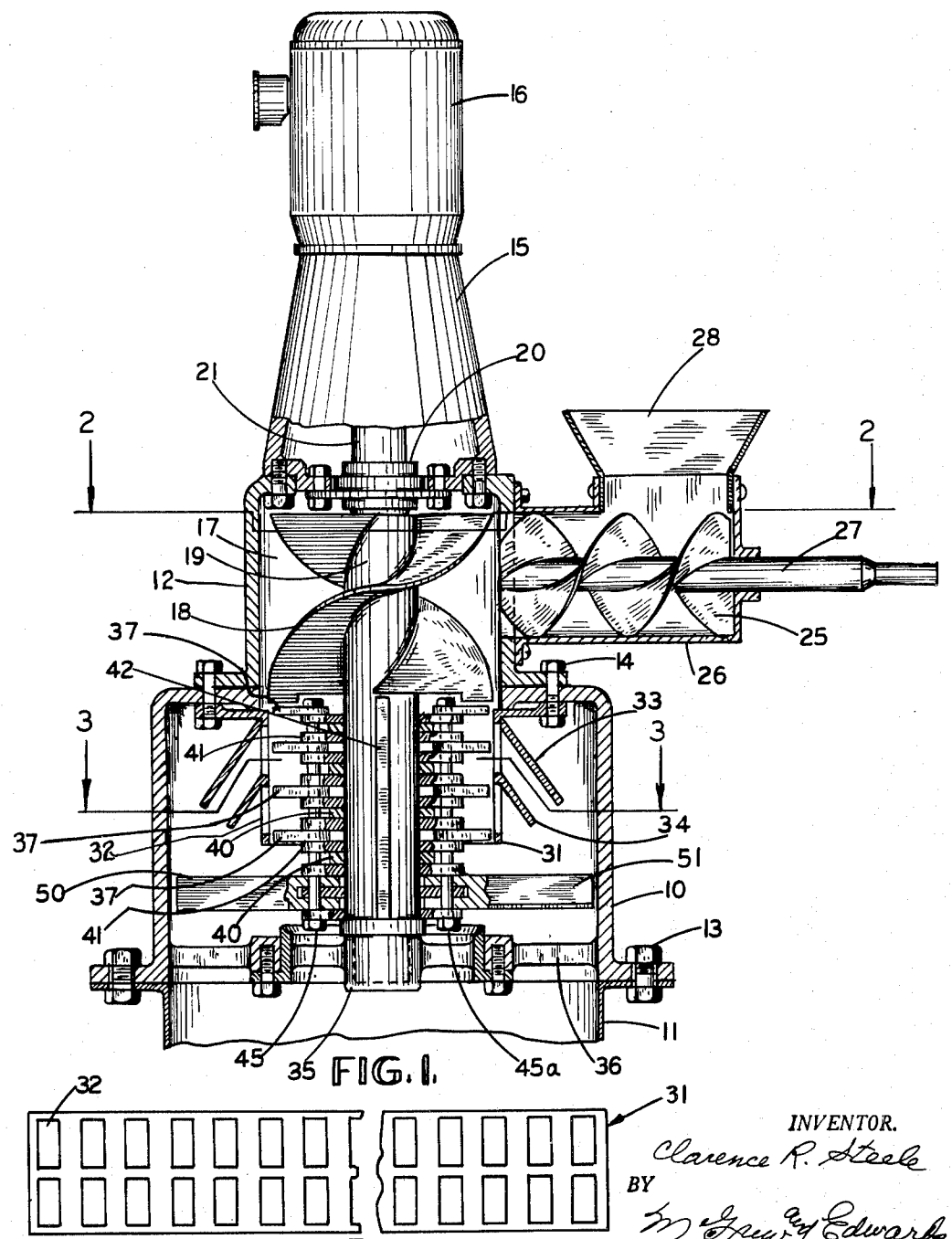
INVENTOR.
Clarence R. Steele
BY
McGrew and Edwards
ATTORNEYS March 22, 1966  C. R. STEELE  3,241,587
METHOD OF DISINTEGRATING VEGETAL MATTER
Original Filed Nov. 17, 1960  2 Sheets-Sheet 2

INVENTOR.
Clarence R. Steele
BY
McGrew & Edwards
ATTORNEYS

United States Patent Office 3,241,587
Patented Mar. 22, 1966

3,241,587
METHOD OF DISINTEGRATING VEGETAL MATTER
Clarence R. Steele, Denver, Colo., assignor, by mesne assignments, to American Factors Associates Limited, Honolulu, Hawaii, a corporation of Delaware
Original application Nov. 17, 1960, Ser. No. 69,992, now Patent No. 3,137,334, dated June 16, 1964. Divided and this application Aug. 19, 1963, Ser. No. 302,867
6 Claims. (Cl. 146—239)

This is a division of application Serial No. 69,992, filed November 17, 1960, for Disintegrator, now Patent Number 3,137,334.

This invention is directed to a comminutor or disintegrator and more particularly to method and means for distintegration and size reduction of vegetal materials.

In the comminution and size reduction of vegetal materials, and particularly fibrous vegetal materials such as sugar cane, special designs, construction, and method of operation are required because available apparatus used in treatment of other material of similar size is not suited for treating certain of these vegetal materials, such as sugar cane, having intrinsic moisture or natural sap content which tends to cause lumping, agglomerating build up or packing of material in the apparatus. I have found it desirable that the material treated be forced into and through the zone of disintegration and maintained under pressure during its passage therethrough. Further, my invention takes advantage of this same tendency of such vegetal materials to agglomerate by providing a novel internal screening closure and deflecting structure at a subsequent stage. The disintegrating zone includes novel hammer members, which reduce the vegetal material to a finely divided mass, and are designed to overcome the deleterious effects of tramp iron, stones and the like in the feed.

Briefly, my invention is comprised essentially of a housing having an inlet at one end and an outlet at the opposite end into which cut or chopped materials are force-fed through a restricted feed conduit at the top. The upper zone of the housing has additional force feeding mechanism which continually pushes or forces the material into and through the disintegrating zone in contact with a plurality of vertically spaced groups or sets of hingedly mounted hammer members so as to reduce the feed mass to a finely divided, substantially homogeneous mass and extrude or force it as substantially contiguous rod-like mass through a plurality of large, generally rectangular, apertures in an internal screening closure. The material forced through the apertures, is deflected downwardly by a plurality of vanes or baffles, which tend to choke the discharge from the apertures and aid the extruding process. The downwardly and outwardly positioning of the vanes or baffles directs the rod-like masses into contact with impellers which break up the rods and lumps of material and eject it for final movement through the outlet.

Because of the novel hinged or pivotal mounting arrangements for the hammers, tramp iron, rocks, and similar foreign materials do not damage the hammers with which they may come in contact. The same hammer mounting arrangement and construction also provides multiple selective arrangements of hammers at various positions in the disintegrating zone.

It is an object of my invention to provide a simple, efficient and economical method of disintegrating vegetal materials which is adapted to accommodate variations in properties and characteristics of such material by simple adjustments of component parts of the mechanism used in performing such methods.

Another object of this invention is to provide simple, durable and efficient apparatus for disintegrating vegetal materials which employs a force feeding action into, through and out of the disintegrating zone so as to maintain full capacity operation over extended periods of treatment.

Still another object is to provide a novel hammer arrangement which not only accomplishes the desired function of disintegration, but also employs a novel mounting to prevent damage to the hammers by foreign materials passing in contact therewith.

It is a further object of my invention to provide a novel closure and aperture arrangement enclosing the disintegrating zone which takes advantages of inherent characteristics of material being processed to obtain a superior disintegration.

Other features and advantages of my invention, including novel details of construction and combinations and arrangements of parts, will become obvious to those skilled in the art from the following description in which reference is made to the appended exemplary drawings. In these drawings:

FIG. 1 is a partially broken side elevation of disintegrating apparatus embodying features of my inventive concept;

FIG. 5 is a developed elevation of a portion of the enclosure for the disintegration zone in the apparatus of FIG. 1.

Figure 3:
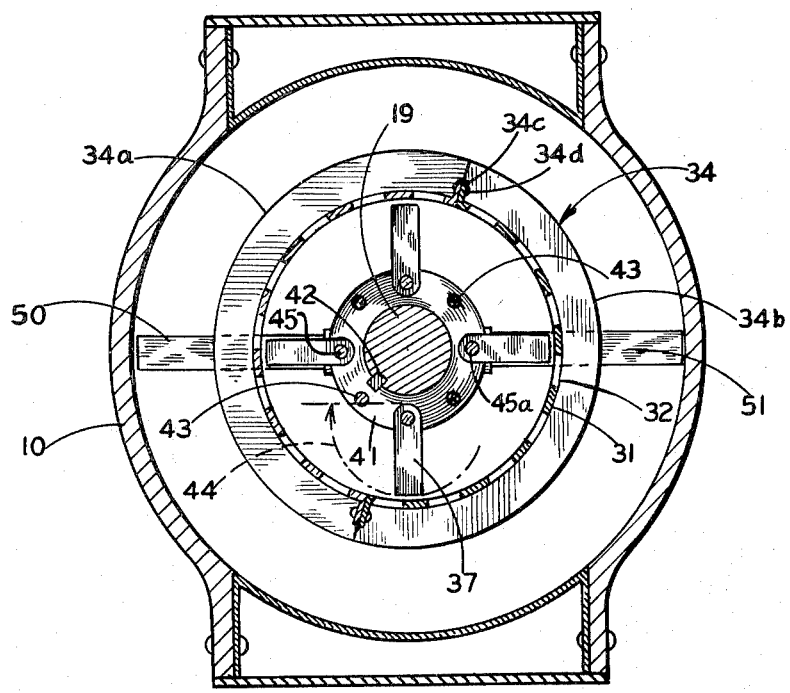
FIG. 3 is a partial section taken along the line 3—3 of FIG. 1.

Before describing the drawings in detail, it should be understood that I do not wish to be limited thereby, but rather by the spirit and scope of my invention as defined in the hereafter appended claims. Apparatus features disclosed but not claimed herein have been claimed in my copending application referred to previously.

A disintegrator according to my inventive concepts is shown in FIG. 1 as including a generally tubular central housing section 10 connected between a discharge casing 11 and an upper housing 12 by means such as bolts 13 and 14, respectively. Mounted on the top of the housing 12 is a housing 15 for supporting a power source 16 such as an electric motor.

The disintegrator preferably has an upper feed distributing zone 17 with a positive feed mechanism therein comprised of a plurality of vertically spaced impellers preferably in the form of the vertically mounted double screw conveyor 18. The conveyor 18 is mounted on a central shaft 19 which is suitably supported by the bearing arrangement 20 and forms an extension of the power take off shaft 21 of the motor 16. A second positive feed mechanism, also preferably a screw conveyor, and shown as double screw conveyor 25, extends through a housing 26 adjoining a side of housing 12 at the top of distributing zone 17 to provide a force feed to said zone and a hopper 28 delivers the feed into housing 26. The shaft portion 27 of the conveyor 25 extends outwardly for interconnection with a power source (not shown).

A disintegrating zone is disposed below the upper feed distributing zone 17 and receives the vegetal material force fed by conveyor 18. A housing or closure 31 forms an annular extension of housing 12 and has a plurality of parallel rows of enlarged apertures 32 (see FIG. 5) which in commercial devices may be of the approximate dimensions of two and one-half inches wide by four inches high. The height of the closure member 31 is a substantial portion of the length of the central housing or casing 10 and preferably is about one-half the height thereof.

As shown in FIG. 5, the apertures 32 are arranged in upper and lower rows, and baffles such as baffles 33 and 34, extend at a downward inclination from the top of each row in substantially parallel relationship. Baffles 33 extend outwardly beyond baffles 34 in spaced relation to housing 10 and define passages of substantially uniform size from top to bottom. As shown in FIG. 3, baffle 34 is formed in two sections 34a and 34b having end flanges 34c secured by bolts 34d. Baffle 33 may be assembled in the same way.

The lower end of the shaft 19 is maintained in a thrust-bearing relationship with a lower housing 35 by a supporting spider assembly 36. A plurality of vertically spaced hammer members 37 are supported on the shaft 19 for conjoint rotation therewith in substantially horizontal paths. The preferred manner of mounting these hammers is to sandwich them between a spacer 40 and a collar 41 disposed directly above and below each hammer 37. This arrangement is repeated and continued along the shaft from the top to bottom of the disintegrating zone. The collars and hammers are held together in the sandwich by elongated bolt and nut arrangements such as 45 and 45a.

In FIG. 3 it will be seen that the collar members 41 are keyed to the shaft 19 by an elongated key 42 fitting in opposed complementary slots in the collars and shaft. With this arrangement, each of the hammers 37 is adapted for limited horizontal pivotal movement, between pins 43, normal to the shaft. These pins are spaced at regular intervals around the collars, and will be referred to in more detail hereinafter. The dotted line 44 in FIG. 3 is indicative of the range or magnitude of pivotal movement of the hammers 37.

One or a plurality of impellers are mounted on shaft 19 below the hammers 37 for conjoint rotation therewith to intercept falling material discharged through openings 32. In the drawings, I have shown a pair of hinged impellers 50 and 51 spaced 180° relative to each other and mounted in the same horizontal plane. The outer ends of the impellers are disposed in closely spaced relation to housing 10 so as to contact falling material throughout the entire area of housing 10.

Figures 2, 4:
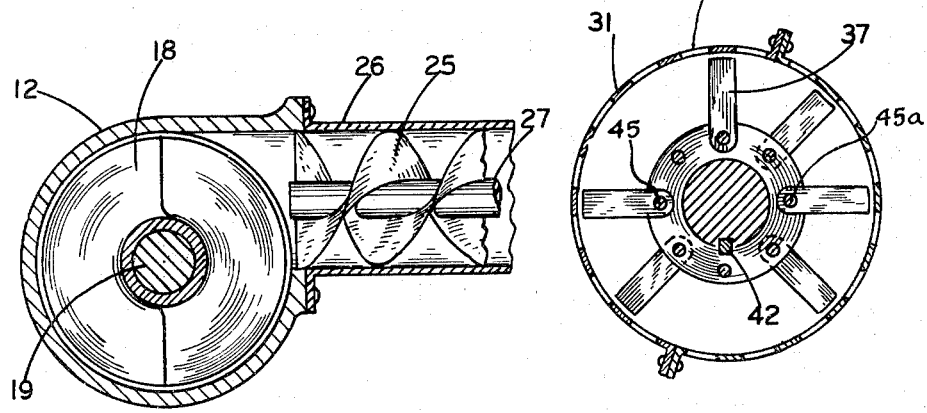
FIG. 2 is a section along the line 2—2 of FIG. 1.
FIG. 4 is an alternative arrangement of hammer elements of a device such as shown in FIG. 1.

The pins 43 are arranged for selective interchangeable and staggered arrangements for mounting the hammers 37, such as the arrangement shown in FIG. 4, wherein the uppermost collar shown has three hammers mounted thereon. The collar below the uppermost, also has three hammers but they are staggered in non-equiangular relation to the uppermost hammers.

In assembling the hammers for a given operation, the spacing positions are selected and elongated bolts such as 45 or 45a are passed through aligned openings in the collars 41 and hammers 37. After securing the hammer spacing in this manner, pins 43 are inserted into the remaining openings so as to act as stops for limiting pivotal movement of the hammers.

In operation, a disintegrator such as shown in the drawings may be placed in a conventional material treatment circuit such as a sugar cane refinery. The material which is fed to the disintegrator will have been previously reduced to about three or four inch lengths and is fed into the feed hopper 28 and thence into contact with the positive feed means, or double screw conveyor 25. The rotating conveyor 25 in housing 26 forces the confined material into the upper feed zone 17. The double screw conveyor or positive feed means 18 rotating therein on the shaft 19, forces the material down into and through the intermediate disintegrating zone into contact with a plurality of vertically spaced sets or groups of hammers 37. The hammers also are moving in conjoint rotation with the shaft and they hammer and break up the material fed in contact therewith. The comminuted material is forced through the apertures 32 and because of the close spacing between the closure and the ends of the hammers and the inherent tendency of the material, such as vegetal materials to lump and agglomerate, such material is discharged through openings 32 as a rod-like extrusion. The rod-like masses of material passing through the apertures are subjected to the choking influence of the outwardly and downwardly extending baffle members 33 and 34. The deflected material then passes into contact with the impellers 50 and 51 which are also moving in conjoint rotation with the shaft 19. These impellers break up the rods and lumps of material which then fall through the casing 11 in a loosened or fluffy condition for disposition at any stage of the refinery operation.

Any tramp iron, rocks, and other relatively hard foreign material which is included in the feed material will not damage the hammers or impellers because of their pivotal hinged arrangement wherein upon contacting such hard materials, they pivot or move out of contact therewith, without damage to the hammers.

When different consistencies or toughness of feed materials are encountered, selective arrangement of the hammers between their respective collars may be made to provide increased efficiency. For instance, if a relatively tough material is being encountered, the uppermost collars may have only two or three hammers therebetween. The number of hammers in progressively lower series can then be increased and/or staggered with relation to the uppermost, to thereby obtain the desired consistency in the disintegrated product.

A distinctive feature of the structural arrangement previously described is the provision of a space of substantial vertical extent between the lowermost hammer member and the impellers 50 and 51 which permits passage of material outwardly into impact relationship with said impellers and discharge in a fluffy consistency distant from the shaft rather than packing around said shaft as otherwise might occur.

Another distinctive feature of the arrangement is the choking effect on the intermediate zone deriving from the position of baffles 33 and 34, which cause material in the intermediate zone to be delayed inwardly of the periphery of the enclosure before discharge through the apertures 32. Most of the hammer action is directed against material aligned with said openings rather than material located between the walls of closure 31 and the outer ends of hammers 37, thereby preventing an accelerated passage of material through the intermediate zone and assuring adequate hammer impact to attain the desired reduction before such material passes out of the discharge apertures 32.

Having thus described my invention, what I desire to have protected by Letters Patent is set forth in the following claims.

I claim:

1. The method of disintegrating materials, which comprises force feeding a stream of feed material to be disintegrated through a restricted zone, forcibly directing the said feed material from said restricted zone in a direction substantially normal to its previous movement into a disintegrating zone, moving the feed material through said disintegrating zone in contact with a plurality of vertically spaced disintegrating hammers and through restricted openings in the disintegrating zone so as to extrude the material from said disintegrating zone as substantially contiguous rod-like masses, and subjecting the rod-like masses to an impacting action during movement away from said disintegrating zone.

2. The method of disintegrating materials, which comprises force feeding a stream of feed material to be disintegrated through a restricted zone into a disintegrating zone, passing the feed material through said disintegrating zone in contact with a plurality of vertically-spaced, rotary disintegrating hammers to reduce the material, extruding the material from said disintegrating zone as contiguous rod-like masses of material, deflecting said contiguous rods of material away from the disintegrating zone in a retarded movement to a point of gravitational movement, subjecting the extruded rod-like masses of material to an impacting action during said gravitational movement, and removing the material therefrom through an outlet for disposition.

3. The method of disintegrating materials, which comprises force feeding a stream of feed material to be disintegrated in a compacting movement through a restricted horizontally extending zone, forcibly directing the feed material from said restricted zone through a restricted vertically extending zone into a confined disintegrating zone of substantial vertical extent, moving the descending feed material through said disintegrating zone in contact with a succession of vertically spaced disintegrating hammers so as to reduce and compact the material, extruding the material from said disintegrating zone through restricted openings as substantially contiguous rod-like masses, and subjecting the rod-like masses to an impacting action during gravitational movement away from said disintegrating zone so as to produce a fluffy consistency in the disintegrated material.

4. The method of disintegrating materials, which comprises force feeding a stream of feed material to be disintegrated in a compacting movement through a restricted horizontally extending zone, forcibly directing the feed material from said restricted zone through a restricted vertically extending zone into a confined disintegrating zone of substantial vertical extent, moving the descending feed material through said disintegrating zone in contact with a succession of vertically spaced disintegrating hammers so as to reduce the feed material to a finely divided homogeneous material, extruding the homogeneous material from said disintegrating zone through restricted openings as substantially contiguous rod-like masses, deflecting the extruded material away from the disintegrating zone in a retarded movement to a point of gravitational movement, and subjecting the extruded rod-like masses to an impacting action during said gravitational movement.

5. The method of disintegrating materials, which comprises force feeding a stream of feed material to be disintegrated in a compacting movement through a restricted horizontally extending zone, forcibly directing the feed material from said restricted zone in a vertical extending restricted zone into a confined disintegrating zone of substantial vertical extent, moving the descending feed material through said disintegrating zone in contact with a succession of vertically spaced disintegrating hammers so as to reduce and agglomerate the material, extruding the agglomerated material from said disintegrating zone through horizontally extending restricted openings in a retarded movement as substantially contiguous rod-like masses, and breaking the rod-like masses into loose fluffy material by a succession of impacting actions applied during gravitational movement away from said disintegrating zone.

6. The method of disintegrating materials, which comprises force feeding a stream of feed material to be disintegrated in a compacting movement through a restricted horizontally extending zone, forcibly directing the feed material from said restricted zone through a restricted vertically extending zone to a confined disintegrating zone of substantial vertical extent, moving the descending feed material through said disintegrating zone in contact with a succession of vertically spaced rotating disintegrating hammers so as to reduce and agglomerate the material, extruding the agglomerated material under centrifugal influence from said disintegrating zone through horizontally extending restricted openings as substantially contiguous rod-like masses, deflecting the extruded material downwardly from the disintegrating zone to a release point of gravitational movement, and breaking the falling rod-like masses into loose fluffy material by a succession of impacting actions during gravitational movement away from said disintegrating zone.

References Cited by the Examiner

UNITED STATES PATENTS

| 287,360 | 10/1883 | Bell | 146—192 |
|---|---|---|---|
| 2,545,159 | 3/1951 | McGihon | 146—175 X |
| 2,952,288 | 9/1960 | Schnell | 146—192 |

FOREIGN PATENTS

| 285,918 | 7/1915 | Germany. |
|---|---|---|

ROBERT C. RIORDON, *Primary Examiner.*

J. SPENCER OVERHOLSER, *Examiner.*